(12) United States Patent
Koenck

(10) Patent No.: US 7,322,526 B1
(45) Date of Patent: *Jan. 29, 2008

(54) SYSTEM FOR READING OPTICAL INDICIA

(75) Inventor: Steven E. Koenck, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/302,454

(22) Filed: Dec. 13, 2005

Related U.S. Application Data

(60) Continuation of application No. 10/776,027, filed on Feb. 10, 2004, now Pat. No. 6,974,085, which is a continuation of application No. 09/198,097, filed on Nov. 23, 1998, now Pat. No. 6,688,523, which is a continuation of application No. 08/345,268, filed on Nov. 28, 1994, now abandoned, which is a continuation of application No. 07/972,822, filed on Nov. 6, 1992, now abandoned, which is a division of application No. 07/616,602, filed on Nov. 21, 1990, now abandoned, which is a continuation-in-part of application No. 07/238,701, filed on Aug. 31, 1988, now Pat. No. 5,019,699.

(51) Int. Cl.
*G06K 7/10* (2006.01)

(52) U.S. Cl. .......................... 235/462.45; 235/462.46; 235/462.47; 235/472.01

(58) Field of Classification Search .......... 235/462.45, 235/462.46, 462.47, 462.1, 462.11, 462.08, 235/462.09, 462.2, 462.21, 472.01–3
See application file for complete search history.

(56) References Cited

U.S. PATENT DOCUMENTS 6,688,523 B1 * 2/2004 Koenck ................. 235/462.06

* cited by examiner

*Primary Examiner*—Karl D. Frech
(74) *Attorney, Agent, or Firm*—Shook, Hardy & Bacon L.L.P.

(57) ABSTRACT

A portable hand-held reader unit includes a photosensor array interiorly of the unit and optics for focusing an image of indicia of information contained on and occupying a predetermined area on a label exteriorly of the reader unit. The reader unit further includes a flashable light source such as a xenon flash tube which is disposed in a ring-like manner about the optical field of view of the reader unit. A marker source which in a preferred embodiment comprise four light sources such as photo diodes or laser diodes, for example, are peripherally disposed interiorly of the reader unit laterally adjacent the photosensor array or in another embodiment at the four corners of the photosensor array. Light emitted from the light sources is projected through the optics of the reader unit peripherally of the field of view of the reader unit as marker beams which impinge a surface toward which the reader unit may be pointed in marker spots peripherally of the predetermined area. When the impinging marker spots of light bracket the information indicia on the label and the xenon tube is flashed, the instantaneous illumination of the label transfers an image of the information indicia onto the photosensor array within the reader unit from where the information may be stored within memory or transferred by communication links to a central processor.

2 Claims, 5 Drawing Sheets

SYSTEM FOR READING OPTICAL INDICIA

CROSS REFERENCE TO PRIOR APPLICATION

This is a continuation of U.S. Continued Prosecution Application filed May 29, 1998; which is continuation of U.S. application for patent Ser. No. 08/345,268, filed Nov. 28, 1994; which is a continuation of U.S. application for patent Ser. No. 07/972,822, filed Nov. 6, 1992, which is a divisional of U.S. application for patent Ser. No. 07/616,602, filed on Nov. 21, 1990; which is a continuation-in-part of U.S. application for patent Ser. No. 07/238,701, filed on Aug. 31, 1988, now U.S. Pat. No. 5,019,699, issued May 28, 1991.

BACKGROUND OF THE INVENTION

1. Field of the Invention

The invention relates generally to code readers and particularly to readers which sense optically discernible symbol combinations or codes, such as bar codes.

2. Discussion of the Prior Art

1. Hand-held optical character reading equipment that has been available in the past has not performed well. The reader must be positioned accurately during the entire movement across the label for a valid read to occur. Operators usually "scrub" the label with the reader rather than carefully aligning the reader on the label, and often give up and manually key the information into the terminal.

The primary reason that accurate alignment is required is that the reader uses either a linear matrix of sensing elements, say sixty-four, or a rectangular matrix of sensing elements, say fourteen by forty. The recognition algorithms typically used in these systems assume that the sensor is oriented accurately over or across the character to be read with a misalignment of less than seven degrees typically specified. The operator's guides for the present products instruct the operator to hold the reader exactly perpendicular, centered on the edge of the line to be read, not tilted, skewed, angled or rocked, and to hold this alignment during the sweep across the label. It is unsurprising that few operators use the readers in this way, and that poor read rates and dissatisfaction with the criticality of the reader alignment during scanning, have been serious problems.

2. To date, there doesn't appear to be an optical character reader (OCR) product available that realistically has the capability to be operated portably. Power consumption and circuit complexity seem to be the factors that have discouraged development in this area.

3. While there was significant competition between the use of bar code and OCR systems through the late 1970's, bar coding seems to have emerged as the preferred technology. It is quite likely that the reason for this "win" is the poor performance of the available OCR equipment. If a very good, cost effective portable hand-held OCR reader were available, OCR might again become a contender for a significant share of this large market. The biggest factors in favor of an OCR system are that the label is directly human readable and the information density is high so that minimum label space is required for the information to be presented.

SUMMARY OF THE INVENTION

A basic concept of the invention is to provide a hand-held scanner which illuminates the entire width and height of a line or lines of code elements or characters on a label with a highly intense, short duration light pulse, then focusing the reflected area image through an optical lens system onto an imaging device, converting the sensed area signal to a digital signal which may then be stored, manipulated and processed by logic circuits as a complete area image to identify the information content.

In a preferred implementation of the hand-held area image scanner, the light source might be one or more xenon flash tubes arranged in a circumferential configuration to provide uniform illumination of the label surface. A lens system focuses an image of the entire label on the optical surface of the imaging device, preferably a solid state sensor of the charge coupled device type. With the proliferation of small, inexpensive consumer video cameras, very good, cost effective imaging devices of this type have become readily available. The output of the imaging device is converted to a digital signal which is interfaced to a digital processor for storage of the image pattern in memory. Once the information is contained in memory, processing and recognition algorithms may be performed "off-line" by the digital processor to rotate, normalize and enhance the image, remove "noise", and identify the coded information. A novel feature of this hand-held scanner is its ability to identify a broad set of optical information symbols including bar codes. Thus a hand-held reader may be configured that has the ability to read virtually any optically coded information while overcoming the long standing problems with prior hand-held OCR systems.

According to a teaching of the present invention, a hand-held optical reader has an area array of photosensor elements of size and resolution so as to register an entire line or multiple lines of characters at one time. Preferably, the entire field of symbols or characters or both, disposed on a label or the like is illuminated simultaneously by a brief flash of a highly intense light source. In a preferred implementation, a xenon flash tube of ring configuration surrounds the optical axis in the vicinity of a lens means which serves to focus the entire line or lines of code symbols or characters onto a complete image sensor array.

According to another aspect of the invention, alignment of the code configuration of symbols, characters or the like with the "field of view" of the reader may be achieved by orienting or pointing to position optical marker indicia. The marker indicia bracket or frame a sensing area delineated by the field of view of the reader, and impinge on a support surface peripherally about the region within which the code configuration is contained. The marker indicia are visually discernible impinging projections of marker beams which originate from marker type light sources of the reader.

According to a more specific aspect of the invention, the marker beams may be shaped by optical means to project linearly shaped marker spots as visually discernible indicia against an impinging surface, the linearly shaped indicia bounding the area within the field of view which will be focused on a photosensor array within the reader.

Other objects, features and advantages of the invention will be apparent from the following detailed description taken in connection with the accompanying drawings, and from the individual features of the appended claims.

DETAILED DESCRIPTION

Incorporation by Reference

Figure 1:
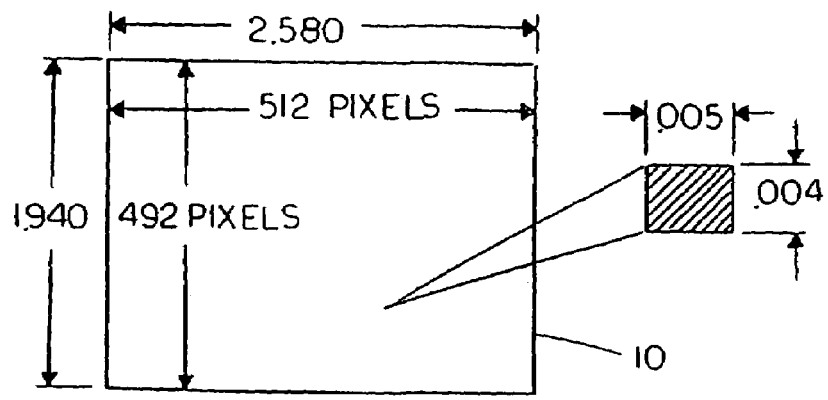
FIG. 1 is a diagram for illustrating the optical sensing area as is defined by a field of view of a lens system, such as from the use of a typical solid state video imaging array and a lens system with a magnification ratio of ten to one, in a hand-held optical reader in accordance with the present invention.

The disclosure of the following applications are hereby incorporated by reference in their entirety: Ser. No. 894,689, filed 8 Aug. 1986; Ser. No. 07/422,052, filed 16 Oct. 1989; and Ser. No. 07/875,791, filed 27 Apr. 1992.

General Explanation of a Preferred Embodiment of the Invention

The biggest negatives surrounding the use of portable OCR systems have related to the inherent weaknesses of the available hand-held scanner technology. The purpose of the described invention is to substantially improve the performance and capabilities of hand-held OCR scanners so that this inherently convenient coding method might once again become a viable alternative for automatic identification applications.

The invention consequently seeks to eliminate the need for accurately aligning the reader with respect to the codes to be read. An OCR device in accordance with the invention would therefore desirably include a provision for instantaneously illuminating a region exterior to the reader which region contains the combination of codes or characters to be read. Thus during a single instance of illumination, the selective reflection representing relatively darker and lighter elements of the code configuration to be read may be imaged or focused with suitable optics at an interior region within the reader, the interior region being referred to also as an imaging area. An array of photosensor elements is disposed at the interior imaging area. The photosensor elements receive during that instant of illumination from any information at the exterior region a complete light image or optical image at the interior region. The instantaneous transfer of the image to the imaging area substantially eliminates risk of error due to an operator causing an inadvertent movement of the reader. A possible source of error in aiming was recognized, however. Such source of error may be minimized, if not totally eliminated, when an operator uses a marker source as provided in accordance with the invention. According to the invention it is, consequently, contemplated to identify or mark the region from which optical information would be transferred to the area array of photosensor elements or photosensor array.

As a specific example, marker beams originating from light sources at the four corners of the photosensor array may be projected via suitable optics onto a supporting surface carrying the information, such as a label, to be read. The beam of the light sources may be shaped optically, such as by non-spherical lenses associated with the light sources to linearize the mark spots impinging the surface containing the information. In the case of a marker beam of elongate, linearized cross section, the light sources need not be located at the corners of the photosensor array, though conveniently the optics for projecting and focusing the image of information onto the photosensor array may be used. The marker beams bracket the optical field of view of the photosensor array, desirably in alignment with the periphery thereof. Consequently any information, such as contained on bar code labels, within the region bounded by the marker beams is necessarily projected or focused onto the photosensor array.

Once the image is focused on the photosensor array, the output of each photosensor element may be electrically read and stored in accordance with data processing techniques. However, it needs to be pointed out that the recorded or stored image is a "raw image", as it was received during the instance of illumination. The image may contain an image of dirt spots which may have adhered to portions of a bar code, for example.

One advantage of the OCR device in accordance with the invention over traditional scanner units is that an entire area of the code has been recorded or stored. A scanner typically operates to read a line or section through a bar code, for example. A number of repeat readings may be employed to achieve an average reading. However, with a more complex unit providing for such repeated scanning operations, any movement during these repeat readings would tend to dilute the accuracy of any of the readings. Hence, in accordance with the invention, the image representing the entire information becomes fixed instantaneously with electronics of the reader. Subsequently any number of readings may be taken and verified from the fixed or stored information. Also, any data manipulation may be performed in accordance with known data processing techniques to transform the stored image to a clearly recognizable data code.

Another advantage is being realized with respect to recently developing trends in the code marking art. With increasing understanding of data processing techniques for inventory handling and merchandising operations in general, a need has emerged to pack more information into each single code combination or code duster. Recent developments suggest replacing conventional single line bar codes with multi-line bar code patterns having a more densely packed configuration. Codes having these new configurations are generally known as "stacked bar codes." Simply stated, stacked bar codes are compressed in the direction perpendicular to the reading direction and are arranged in a multi-line stacked configuration, like a page of printed material. A number of differing standards bar codes exist, two of which are known as "Code 49" and "16K". Code 49 may consist of stacked lines or rows of code indicia two to eight rows high, while the 16K code may use stacked rows of code indicia between two and sixteen rows high.

It is understandable that with conventional code scanners, reading scanned codes at angles other than perfect alignment with the linear arrangement of the codes may present code recognition problems. Of course, if less than the entire code information is recognized, the entire code is typically indicated as not having been read, so that a re-read cycle must be initiated. Since valuable time may be lost by repeating reading operations, it is of course desirable to recognize the code. Since a code may also not have been recognized because of a lateral shift of the active area of the scanner away from the label configuration, either the angular misalignment or a lateral shift may be a cause for non-recognition of the code.

It is apparent that the current invention is particularly advantageous for reading the described "stacked bar codes" as well as other information. The referred to marker beams are able to indicate or show when the entire code pattern is within the region from which an image of the code pattern can be transferred to the photosensor array. Hence, a major source of error is eliminated. Secondly, the instantaneous focusing of the information on the photosensor array reduces the risk of error caused by inadvertent movement of the reader during a prolonged process. Thirdly, since typical data processing techniques permit the code to be aligned electronically after it has become stored in the reader, critical alignment requirements are no longer needed for information to be read from the stored code image.

Initial processing of the image is a normalization process which sometimes also may be referred to as "calibration" during which the orientation of the mage may be recognized and during which blemishes, such as dirt spots, may be recognized and image electronically reoriented and blemishes neutralized in accordance with known data processing techniques. The stored image may then be read by the reader and the information may be transferred to desired electronic data banks.

In FIG. 1, an optical sensing area is delineated which represents the result of the use of a typical solid state video imaging array with a lens system that provides a magnification ratio of ten to one. The resultant active area is 2.58 inches×1.94 inches as indicated.

Figure 2:
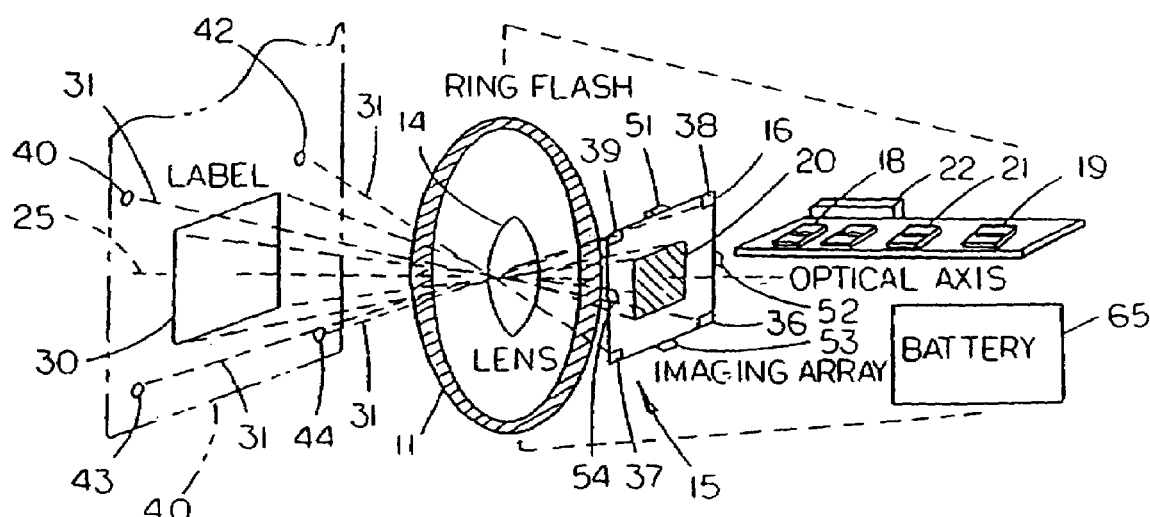
FIG. 2 is a diagrammatic illustration of a preferred form of a hand-held optical reader according to the present invention, arranged so as to have its optical sensing area or field of view completely encompassing the machine-readable code (e.g. bar code) or human-readable information (e.g. line or lines of text) on a label so that a complete instantaneous optical image thereof is projected onto an area array of photosensors within the reader and may be converted by the reader into digital image data and stored in a processor memory of the reader.

FIG. 2 shows a diagrammatic view of an optical system that incorporates the components described. The ring flash is a preferred light source for its ability to provide relatively uniform illumination with minimum backscatter into the imaging device. Also it may be "wrapped" around the lens, as shown, providing a compact, efficient package. The imaging array may be placed directly in line with the optical axis of the reader, so that the optical portion of a hand-held reader can be quite compact.

Operation of the reader consists of the user "aiming" at the target label and activating a switch to initiate the read. The flashtube is effective to provide an essentially instantaneous illumination, so movement of the hand-held reader during this time is noncritical. The digital processor immediately begins clocking the imaging array to read its contents which correspond to the intensity of the light from the active sensing area that was focused on the imaging array. The actual output of the imaging array is normally an analog signal. Since only white or dark information is needed, the conversion decision may consist of a comparator circuit with appropriately selected bandwidth and hysteresis to correspond to the characteristics of the imaging circuit output.

The digital information is assembled into sixteen bit data words corresponding to the word length of the digital processor and stored directly into the processor memory array. An entire image may consist of 492 lines of 512 samples each for a total 251,904 bits or 31,488 bytes of information, as illustrated in FIG. 1. Once the image acquisition process is complete, the digital processor may then begin operating on the image information to remove blemish and noise components, rotate the image to a normalized position, correct for optical skew due to curvature of the target label or reading from an off-axis angle, and the like, to optimize the pattern recognition process. An important feature of the described system is the ability of the digital processor to detect during such discussed normalization the locations of blemishes or flaws in the image sensing array and to store those locations in a non-volatile memory so that flawed image data may be masked or compensated to remove such errors from consideration in the recognition algorithms.

When image normalization is complete, the recognition process may then begin. The first level of recognition is to determine whether the coded information is a bar code or a line of characters, for example. If a bar code is recognized, standard bar code decode algorithms may be employed. If a character format is recognized, then a character recognition algorithm is invoked.

The digital processor employed for the image normalization, processing and recognition functions must be extremely fast and efficient for acceptable user satisfaction. A processor such as the Texas Instruments TMS320C25 type which is designed for digital signal processing applications has the ability to address external program and data memory, perform bit and word manipulations and has extremely fast execution speeds while operating with acceptable power consumption levels for a portable hand-held unit.

Specific Explanation of a Preferred Embodiment (Referring by Reference Numerals to the Diagrammatic Illustrations of the Drawings).

Referring first generally to FIG. 2, there is illustrated somewhat schematically a hand-held area type optical reader. The reader, which may also be referred to as an improved Optical Character Reader ("OCR") device, represents an embodiment according to the present invention. The reader, as will be explained is capable of reading all the characters, bar codes or other information at an optical sensing area such as indicated at 10 in FIG. 1, essentially instantaneously. The area 10 to be read may be illuminated by light from a ring-type illuminator 11, preferably a xenon flash tube. The reader shown schematically as a hand-held scanner unit 12, indicated by dash lines, may house the light source 11, and suitable optics, such as a lens 14. The optics 14 include a focal plane at an interior region 15 of the scanner unit or reader 12. A solid state area type photosensor array such as indicated at 16 is disposed in the focal plane defined by the interior region 15. The photosensor array 16 is comprised of a plurality of photosensor elements arranged in an area corresponding in the sensing area 10 externally of the reader 12 to respective pixels, such as at 17, FIG. 1. The individual photosensor elements or pixels in the area array of photosensor elements or photosensor array 16 may have a density, such as in typical video cameras. Thus, the sensing area 10, as an external projection of the photosensor array 16, is enlarged with respect to the photosensor array 16 in accordance with a magnification ratio, such as ten to one, of optics of such video cameras. However, even with such enlargement of the sensing area 10, the number of pixels 17 illustrated in FIG. 1 provide a resolution of individual pixel of 0.004 inch by 0.005 inch (four mils high by five mils wide).

Figure 4:
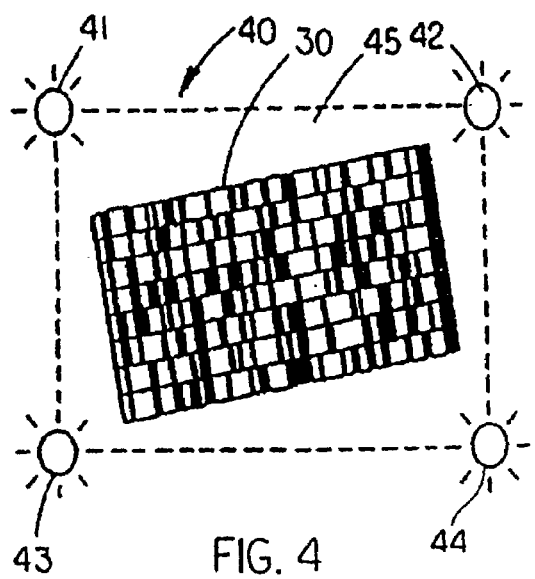
FIG. 4 is an illustration of a stacked bar code and of one of the manners in which a field of view of the optical reader is indicated to a user to facilitate alignment of the field of view with a label bearing indicia such as the stacked bar code.
Figure 5:
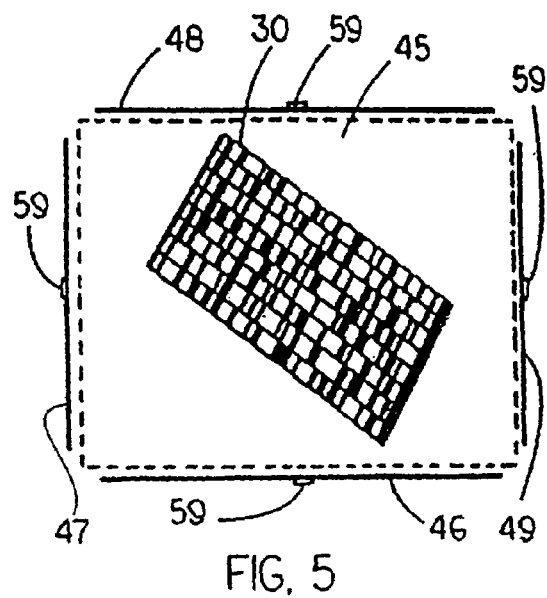
FIG. 5 is an illustration of an alternate manner for indicating to a user of the optical reader the field of view of the information gathering elements in accordance with the invention.
Figure 6:
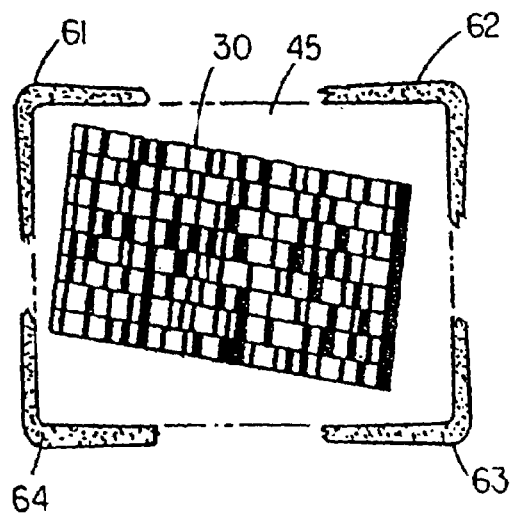
FIG. 6 is an illustration of yet another manner for indicating the field of view of the optical reader.

Once the flash energization of the light source 11 is complete, the photosensor array 16 may be read out, each line of photosensor elements of the array being shifted out serially for example, and the respective lines of photosensor elements being read out in parallel for example to an analog/logic interface component 18 within the hand-held scanner unit 12. A signal processor 19, such as the referred to Texas Instruments TMS320C25 signal processor type, disposed in the scanner unit 12 and connected with the analog/logic interface component 18 may receive from the focussed information image e.g. at 20, FIG. 2, the area image data and supply the raw area image data to an associated memory 21 in the hand-held scanner unit 12 for subsequent processing in the hand-held unit. As an alternative, the raw area image data (e.g. in digital form) may be coupled via an RF or optical link 22 to a host processor (not indicated) for storage and processing. Such a separate host processor may also be portable and carried by the user. Where the focussed information image 20, such as that of a bar code or stacked bar code as shown in FIGS. 4 through 6, on the photosensor array 16 is tilted relative to the longitudinal (widthwise) axis of the array 16, the raw image data as stored in digital form may be subsequently processed so as to be rotated into a normal horizontal disposition prior to decoding thereof by well known algorithms. In reference to FIG. 2, the flash tube 11 and the lens 14 may have circular symmetry relative to their common longitudinal axis 25 which is consequently also the optical axis of the reader 12. Hence the illuminator or flash tube 11 is disposed annularly about the optics represented by the lens 14, so that any angle of tilt of label 30 about axis 25 is not detrimental to uniform optical imaging of the entire information field of the label 30.

Marker beams 31 originating from light sources 36, 37, 38 and 39 at the four corners of area photosensor array 16 may be projected onto a supporting surface 40 carrying label 30, via optics 14, to produce visually discernible indicia, such as marker spots 41, 42, 43 and 44, respectively, so that array 16 may be readily aligned relative to area information e.g. on label 30, as the hand-held unit 12 is being moved into proximity thereto. By way of example, the light sources 36-39 may be light emitting diodes at the four corners of the photosensor array 16, which light emitting diodes may be sequentially pulsed so that the marker spots 41-44 are each produced at a repetition rate of sixty per second when the hand-held scanner unit is placed in a target seeking mode. Once the four marker spots "bracket" the information to be read, as in FIGS. 2 and 4 through 6, regardless of tilt, or regardless of whether the information extends horizontally or vertically, the light source 11 may be triggered, marker spots 41-44 being extinguished by this time, or the wavelength thereof being prevented from affecting the photosensor array by filtering, for example.

As long as the marker spots 41 through 44 bracket the information to be read, e.g., information on the label 30, the image 20 of the entire information field is necessarily focussed on the active or photosensitive area of the photosensor array 16. It should be understood that only the information and not the entire label 30 needs to become located within an area 45 of the supporting surface 40 bounded by the marker spots 41 through 44. FIG. 4 shows a stacked bar code label 30 disposed within the area 45 bracketed by the marker spots 41 through 44. Hence the image of the information represented by the stacked bars of the label 30 is projected onto and becomes focussed on the active area of the photosensor array 16. Though the information is captured within the area 45 at an angle, the image 20 will still be focussed on the photosensor array 16. Hence the entire image 20 with all information bearing dark and light configuration combinations of the code can be read into memory locations of the memory 21.

A first embodiment of manner in which the marker spots 41 through 44 define the area 45, such as described with respect to FIG. 2, is also illustrated in FIG. 4. The area 45 as indicated by dashed lines is bracketed at its corners by the marker spots 41 through 44. Thus, to line up indicia to be read, such as the stacked bar code label 30, an operator would aim the marker spots 41 through 44 so that information on the label does not extend to or beyond a straight line between two adjacent ones of the marker spots. FIG. 5 illustrates an alternate embodiment of delineating the area 45. In lieu of the marker spots 41 through 44, FIG. 5 shows linear illumination bars 46, 47, 48 and 49 which closely bound the area 45, again as depicted again by the dashed lines. It may be preferred to mark the area 45 by a linear illumination outline comprised of the illumination bars 46 through 49 in that the photosensor array may be allowed to contain an uninterrupted matrix without the need to preserve corner locations thereof for the light emitting diode as described with respect to FIG. 4. Briefly referring back to FIG. 2, the illumination spots or bars 46 through 49 may be produced by light sources, such as light emitting diodes or laser diodes in combination with linear lenses, which may be disposed in the focal plane 15 at midpoints of each of the edges of and directly adjacent the photosensor array 16, as indicated by the numerals 51, 52, 53 and 54 respectively. Thus, as with respect to the earlier described example, the optics 14 may be used to direct light beams resulting in the marker bars 46 through 49 through the optics 14 against the surface 40.

FIG. 5 shows the label 30 disposed at an increased angle with respect to the major outline of the area 45 and of a smaller size. Again, the criterion for focussing information on the active area of the photosensor array 16 is to aim the field of view of the reader 12 as identified to the user by the marker indicia such as the described spots or bars so as to place the information to be read entirely within the area 45. If the angular alignment of the label 30 is less than that illustrated in FIG. 4, and is disposed at an angle with respect to the illustrated rectangular shape of the active field of view in FIG. 5, the user may simply back off the reader 12 away from the surface 40 until the entire information area of the label 30 is contained within the area 45. An increased distance between the label 30 and the reader 12 results in a smaller image of information being focussed on the photosensor array 16. However, as the label 30 shown in FIG. 4, the entire label 30 in FIG. 5 will become focused on the photosensor array 16. The flash illumination by the referred to xenon flash tube 11 may be chosen to allow the "f-stop" of the optics 14 to be stopped down such that the depth of field of the reader is increased to allow the image 20 to become focused on the photosensor array 16 even though the distance between the reader 12 and the supporting surface 40 may vary for example, between two inches to well in excess of one foot. It may further be found convenient to use currently known and available automatic focusing techniques to further increase the ability of the reader to focus the image 20 over a yet further increased range of distances of several feet between the indicia to be read and the reader 12. Such increase in versatility of the reader 12 would result, of course, in a corresponding increase in the cost of the reader.

Figure 7:
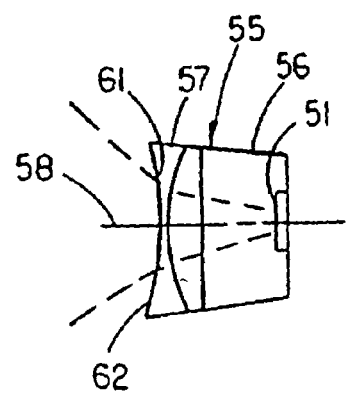
FIG. 7 shows a schematically simplified view of a light source and related linear optics for delineating the field of view of the optical reader as further described herein.

FIG. 7 illustrates a light source (such as shown at 51 through 54 in FIG. 2), say source 51, more generally identified as light source assembly 55, in combination with a typical molded casing 56 including a lens 57 for linearly expanding the light emitted from the source 51 in one or more directions away from its optical axis 58. Thus, as illustrated in FIG. 5, the light emitted from the sources 51 through 54 is expanded linearly from center points shown at 59 into two directions disposed at a 180 degree angle. It may also be possible to change the angle between the two legs 61 and 62 (FIG. 7) from 180 degrees to for example a right angle between the two directions of expansion of the emitted light. With such modification, the expansion direction 62 would be directed into the plane or out of the plane of the drawing of FIG. 7. The configuration of marker spots 61, 62, 63 and 64 in FIG. 6 illustrate a right angle expansion of the light emitted through correspondingly configured lenses 57. In the configuration of the marker spots 61 through 64 the corresponding light sources would be located again at the corners of the photosensor array 16, as shown with respect to the light sources 36 through 39, for example. It would be expected that the intensity of the linearly deflected or expanded light decreases with the distance from the optical center of the non-deflected light beam. Thus, as shown in FIG. 5, the corners of the area delineated by the marker bars 46 through 49 may not be illuminated by the marker bars, while the centers of the sides of the area 45 shown in FIG. 6 may not be illuminated or only slightly illuminated relatively to more brightly illuminated corners by the respective marker spots 61 through 64. FIG. 6 also shows the label 30 disposed entirely within the area 45 delineated by the marker spots 61 through 64. While FIGS. 4 through 6 show a somewhat rectangular configuration of the marker spots or bars, a square configuration with a correspondingly square configuration of the photosensor array 16 may be preferred. However, the particular shape of the photosensor array 16 and the marked or delineated area 45 are not critical, as long as the area 45 delineated by the marker spots defines the active area 20 disposed in the interior of the reader 12.

In each of the different embodiments, a complete label, e.g. five inches high by five inches wide, having a complete bar code, or row or rows of characters thereon, can be focussed onto the operative area of a complete image photosensor array, such as 16, in response to a single essentially instantaneous flash of a light source, such as 11. As becomes apparent, a relatively larger sized label 30 would simply require an operator of the reader to increase the distance between the label to be read and the reader 12. In an advantageous embodiment, the height dimension of the complete image area array 16 may be such that a complete area information image including the entire area information width, e.g. of an eighty column line of characters, can be read whether the width of the information image is disposed widthwise or heightwise or diagonally on the photosensor array 16. In general, such area information is focusable on the photosensor array 16 in any angular orientation about the optical axis 25. By way of example, a label 30 containing all its information in an area of square configuration 1.3 inches on a side could be disposed so that its width extended horizontally or vertically or at an acute angle on the photosensor array 16 and in each case the entire contents of the label could be read with a single flash of light source 11.

Preferably the hand-held unit 12 contains batteries "BATTERY" (schematically indicated in FIG. 2 at 65) with sufficient energy so as to supply the flashable light source means 11 and the other components of the hand-held unit, so that the unit is essentially self-contained and free of any connecting cable or the like.

The system of FIG. 2 may be provided with an autofocus ranging system, as already referred to above, so that the reader 12 may have the ability to read at extended distances, e.g., up to forty-eight inches and possibly even greater distances, and may also be capable of reading a wider range of target areas. Autofocus systems are common in 35 mm cameras.

The hand-held scanner unit 12 of FIG. 2 may contain the programming to recognize several types of optically discernible indicia of information, such as bar codes as well as conventional character fonts, and to automatically select the appropriate decoding algorithm from those available in its on-board stored program. Furthermore, the hand-held unit 12 may contain an area array photosensor 16 of size and resolution so as to register the above-mentioned multiple lines of characters, e.g., eight lines of eighty characters each at one time. Preferably, the entire information field to be scanned, or instantaneously to be recorded or read, such as represented by label 30 in FIG. 2 is illuminated simultaneously by a brief flash of highly intense light source such as the xenon tube 11.

The reading of bar codes with a complete area photosensor array such as 16, enables the digital data representing a bar code, for example, to be rotated and otherwise normalized as a complete entity prior to decoding, such that the normalized data may correspond to that obtained by sequentially scanning along a bar code parallel to the longitudinal bar code axis at a multiplicity of levels separated center to center e.g. by four mils. By combining the corresponding data points at different levels, e.g., on an averaging basis, defects in the bar code image can be reliably overcome such as defects due to foreign matter, spurious marking and the like. Again, the bar code can be disposed at any random angle relative to the reader during the reading operation, speeding the reading of the labels, reducing operator fatigue and increasing the number of labels which can be read during a working day.

Figure 3:
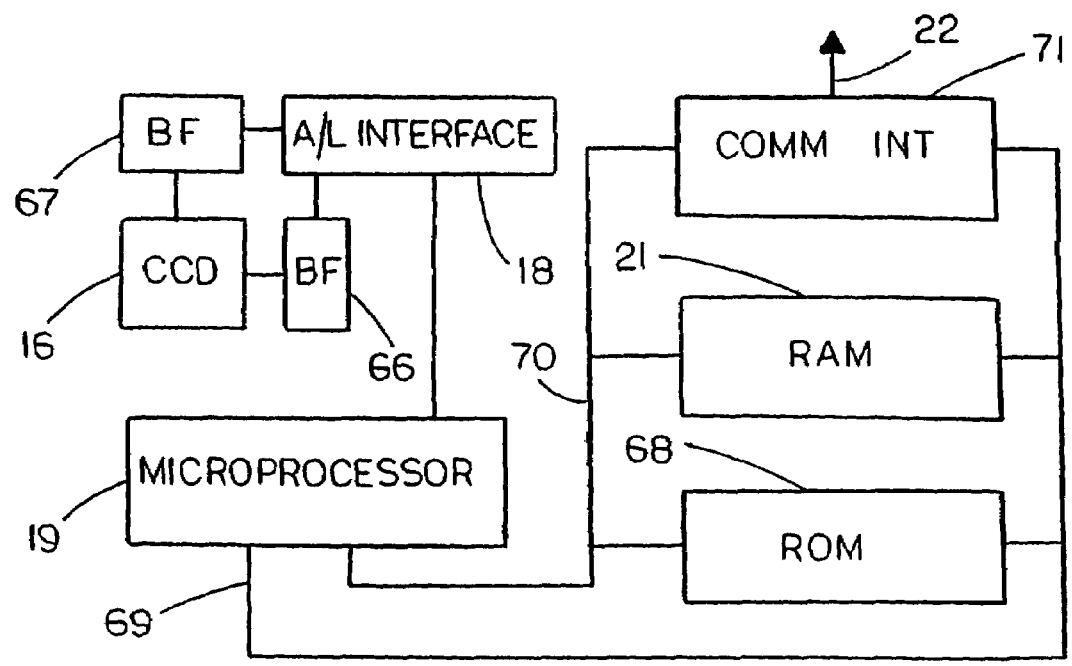
FIG. 3 is a block diagram illustrating a typical logic arrangement of a microprocessor circuit and major functional components as are typically associated with such a circuit, and further illustrating a preferred interface between the array of photosensors of the reader as referred to in FIG. 2 and the microprocessor.

FIG. 3 is a simplified functional block diagram showing the photosensor array ("CCD") 16 coupled through typical driver circuits ("BF") 66 and 67 to the analog/logic interface ("A/L INTERFACE") 18. The data signal output from such typical interface circuit 18 would be coupled directly to the above referred-to microprocessor circuit ("MICROPROCESSOR") 19, such as the preferred Texas Instrument processor TMS320C25 type. A state of the art signal processing circuit at the time of the prior application hereof, the circuit is still a preferred device, though other devices may be available and may be substituted therefor. The specifications of the device 19 provide for 4K words of On-Chip Program ROM and 544 Words of programmable On-Chip RAM. Typically such minimum ROM (Read Only Memory)

and RAM (Random Access Memory) may be supplemented with further programmable memory, such as the memory ("RAM") 21, and with additional read only memory ("ROM") 68. The processor circuit 19 may address and transfer such additional memory by typical address and data buses 69 and 70, respectively. Data may also be transferred to a suitable communication interface ("COMM.INT.") 71, which in turn is coupled to the above referred-to communication link 22, which may be an RF or an optical link. It should be understood that the specifically described elements and their functions are merely for explanatory purposes and various changes may be possible within the scope hereof.

Figure 8:
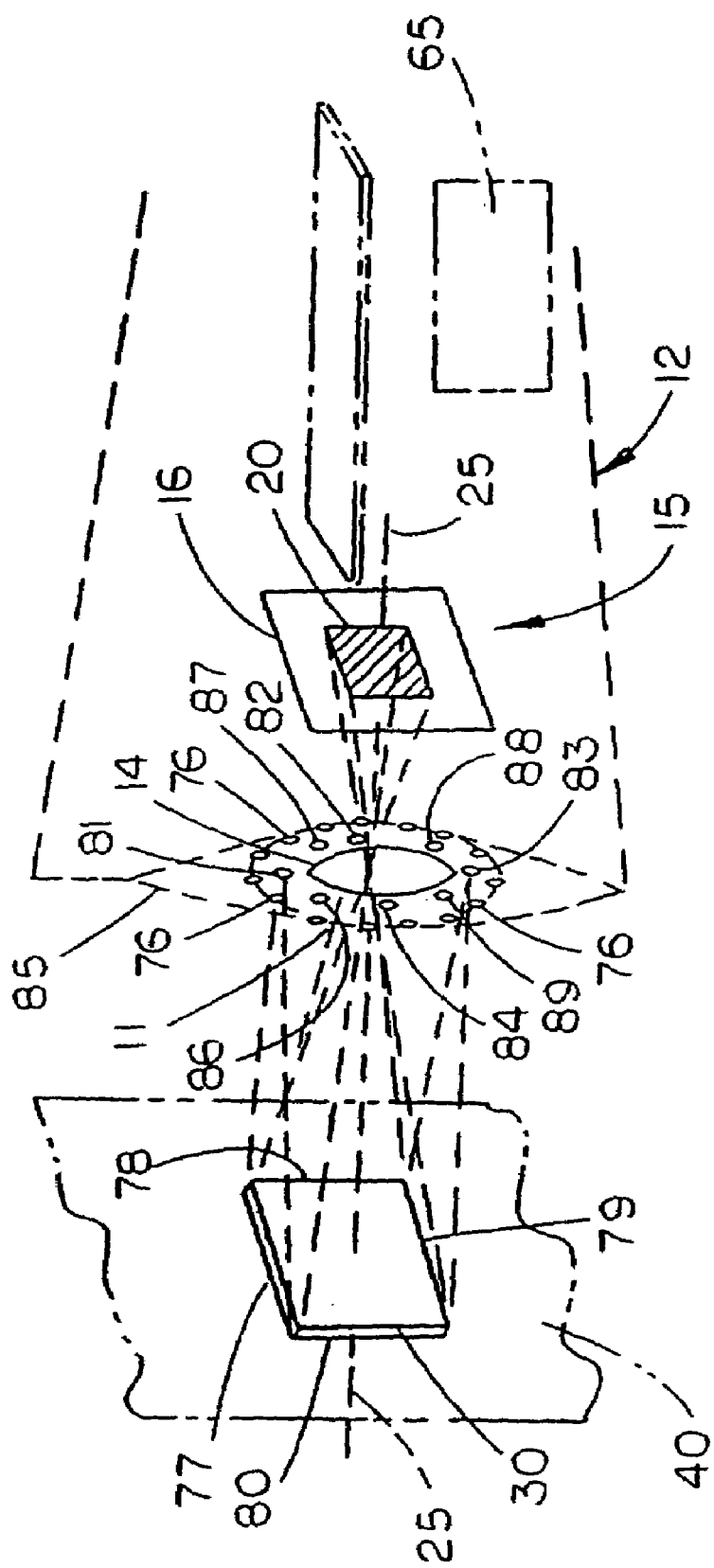
FIG. 8 is a diagrammatic illustration showing the reader of FIG. 2 and illustrating alternative embodiments relating to flashable light sources and aiming aids such as marker sources.

FIG. 8 illustrates alternate embodiments of the present invention indicative of changes within the broad scope of the invention. FIG. 8 shows as FIG. 2 the supporting surface 40 with the label 30, such as a stacked bar code, for example, in relationship to the hand-held optical reader unit 12. The reader unit 12 also includes preferably typical optics 14 and a photosensor array 16 disposed in a focal plane at an interior plane or region 15 behind the optics 14. An image 20 of information representative of the information on the label 30 may be formed on the photosensor array 16 when the reader 12 is activated by instantaneously illuminating an area ahead of the reader 12 and hence the supporting surface 40 in the region of the label 30 when the reader optical axis 25 is aimed toward the label. The illuminator 11 which in the preferred embodiment is a flashable xenon tube, may of course generally be of any of a number of flash type illuminators 11. FIG. 8 therefore illustrates an annular illuminator 11 which is comprised of a number of discrete pulseable light emitting diodes 76. The light emitting diodes are preferably disposed adjacent the exterior portion of the optics 14 of the reader 12 in a plane perpendicular to the optical axis 25, substantially similar to the arrangement of the xenon flash tube shown in FIG. 2. The number of discrete light emitting elements 76 may be chosen to correspond to a total light intensity needed to illuminate the exterior region of the label 30. Depending on the desired range over which the reader 12 is to function, the number of discrete devices may be increased by closer spaces between adjacent ones of the light emitting diodes 76.

FIG. 8 illustrates another change in the described embodiment with respect to the previously described marker sources, such as the light emitting diodes 36 through 39 or the light sources 55 including lenses 57. Even though it is presently considered advantageous to project beams from the marker sources through the optics 14, within reason it is possible to also project marker spots or bars, such as bars 77, 78, 79 or 80 against the surface 40 from respective marker light sources 81, 82, 83 and 84 without having the projected beams be directed through the optics 14 of the reader 12. Thus, the marker light sources 81 through 84 may be disposed externally of the optics 14 and on a frontal portion 85 of the reader 12. The lenses 57 of the light sources 81 through 84 may be disposed to direct the respective marker beams of the light sources substantially along the periphery of the field of view of the optics 14 of the reader 12. As described with respect to FIG. 7, the lenses 57 may be shaped to linearly shape the emitted light of the marker sources in two mutually opposite directions or at an angle other than 180 degrees, depending on the location of the light sources. A disadvantage may possibly be noticed in that the marker sources are not in total alignment with the periphery of the field of view of the optics 14. Consequently, at extremes of an operating range of the reader 12, resulting marker bars or spots, such as the marker bars 77 through 80 shown in FIG. 8 do not delineate precisely the area 45 which corresponds precisely to the active photosensor array 16 projected against the surface 40 through the optics 14. However, only at close range, the marker spots or bars 77 through 80 may form on the surface 40 somewhat externally of the actual area 45, hence indicating an area larger than one that may be read by the reader 12. When the sources are properly placed such deviation may be confined to a range at which normally no readings are taken. At a medium range, the marker bars may be disposed to clearly delineate the area 45. And an area smaller than the actual area 45 may be indicated at an extended distance for reading the label 30. Thus, for practical purposes the marker sources may be oriented that for substantially all readings the predetermined area 45 is bracketed. It should be understood that not only light sources for generating the bars 77 through 80 may be disposed externally of the optics 14, but light sources disposed to project marker beams generally to corners of the rectangular area 45 may be disposed externally of the optics 14. Such alternate light sources 86, 87, 88 and 89 may similarly be disposed as closely as feasible adjacent the optics, and actually may be disposed within the annular configuration of flashable illuminator source elements 76 as shown in FIG. 8. With respect to the latter sources, lenses 57 may be disposed to linearly expand the respective marker beams at right angles so as to bracket the area 45 as indicated in FIG. 6, for example. It should be understood that various other changes suggest themselves from the preferred embodiments as disclosed herein.

Figure 9:
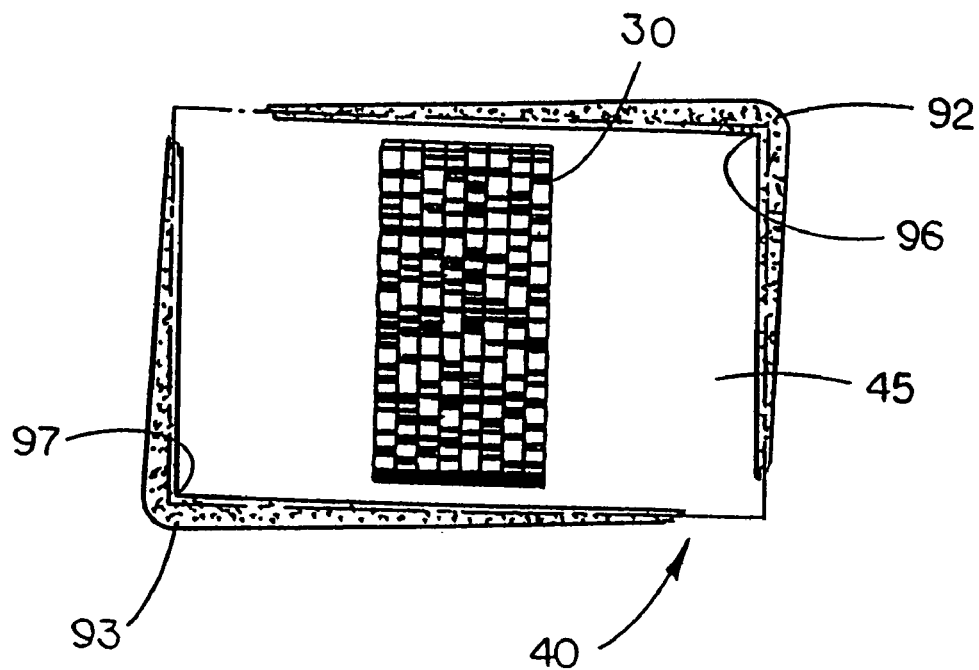
FIG. 9 shows another embodiment for delineating to a user of the reader its field of view, also showing a stacked bar code label encompassed in a vertical orientation within the delineated field of view.
Figure 10:
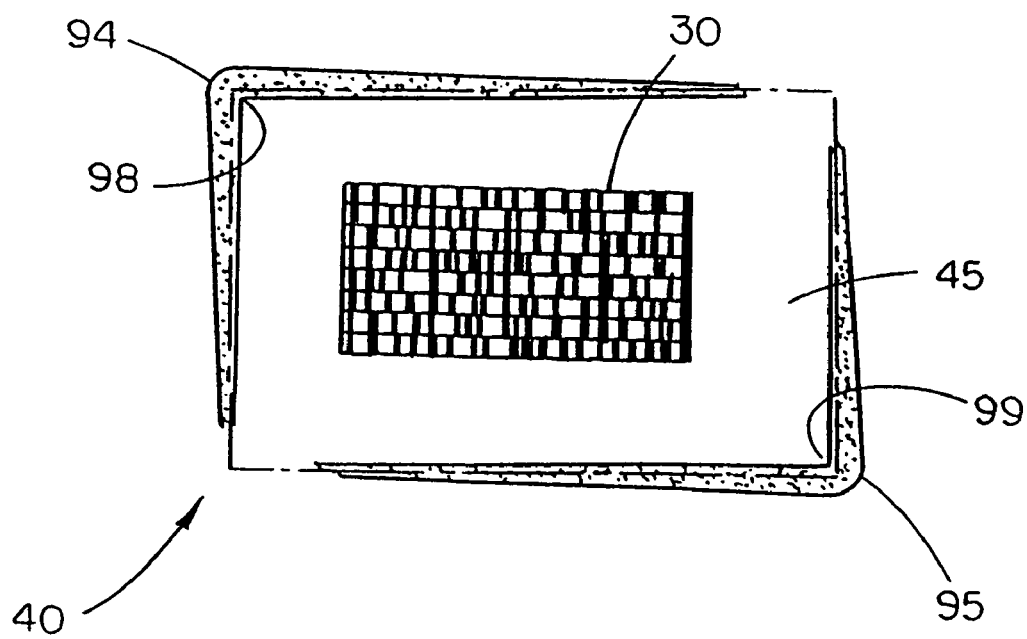
FIG. 10 shows a variation of the embodiment of FIG. 9 for delineating the field of view of the reader, also showing a stacked bar code label encompassed in a horizontal orientation within the delineated field of view.

As an example of changes or variations in delineating the area 45 within the field of view of the reader 12 the marker sources may be advantageously limited in numbers. FIGS. 9 and 10 depict an example of an alternate arrangement of marker sources, the respective impinging marker spots being identified by numerals 92 and 93 in FIG. 9 and by numerals 94 and 95 in FIG. 10. In each of the further described embodiments, marker sources are disposed to generate marker beams impinging on the surface 40 as the respective marker spots 92, 93, 94 and 95 with the earlier described right angle expansion from diagonally opposite corners 96 and 97 of the delineated area 45 in FIG. 9, and from corners 98 and 99 of such area 45 as shown in FIG. 10. Also, the orientation of the labels 30 depict a substantially vertical or heightwise arrangement with respect to the area 45 in FIG. 9, and a substantially horizontal or widthwise arrangement of the label 30 with respect to the area 45 in FIG. 10. The different orientations of the respective labels 30 in each instance further illustrate the above described advantage of the reader in providing for the capture of an area of information on the photosensor array independent of the orientation of such information about the optical axis of the reader.

With respect to the shape of the photosensor array 16, photosensor arrays of the current state of the art are generally of rectangular shape or at least the active areas are of rectangular shape. While the preferred embodiment discloses a generally circular lens or optics 14, the shape thereof is preferred because of the generally rectangular shapes of so-called targets or photosensor arrays 16 of video cameras. It should be understood that the invention in its broad scope may not depend on a sensing area of any particular shape.

The ability to capture and manipulate an entire image with a portable unit has important benefits for optical character reading also. In such instances a reading area of elongate rectangular shape may be preferred. For example, the described embodiments allow the use of image enhancement algorithms, e.g., of the type developed for enhancement of deep space probe images, as well as image normalization, e.g., such as image rotation and scaling. Non-linear scaling for improving recognition efficiency with respect to irregular surfaces such as curved surfaces, and with respect to off-axis viewing angles, is also feasible.

It will be apparent that many modifications and variations may be effected without departing from the teachings and concepts of the present disclosure.

The invention claimed is:

1. In a portable optical reader system,
(a) a hand-held optical reader unit having an optical system for focusing at an interior region of the unit an optical image of information comprising discernible indicia disposed within a predetermined area of information external of the reader unit wherein said hand-held optical reader unit having a longitudinal optical axis;
(b) an area array of photosensor elements disposed at said interior region of said unit where the optical image of information is to be focused for receiving the optical image of information from the predetermined area;
(c) a decoder remote from said hand-held optical reader unit for decoding discernible indicia disposed within optical image of information from said predetermined area;
(d) a communication link between said hand-held optical reader and said decoder for communicating optical image information received by said area array of photosensor elements; and
(e) a light source for illuminating the exterior region exterior of the hand-held optical reader unit and including the predetermined area of information, such that a complete image of the information within the predetermined area is focused onto said area array of photosensor elements wherein said light source is a flashable light source said flashable light source means including an illuminator disposed in a ring configuration about said longitudinal optical axis.

2. In a portable optical reader system,
(a) a hand-held optical reader unit having an optical system for focusing at an interior region of the unit an optical image of information comprising discernible indicia disposed within a predetermined area of information external of the reader unit wherein said hand-held optical reader unit having a longitudinal optical axis;
(b) an area array of photosensor elements disposed at said interior region of said unit where the optical image of information is to be focused for receiving the optical image of information from the predetermined area;
(c) a decoder remote from said hand-held optical reader unit for decoding discernible indicia disposed within optical image of information from said predetermined area;
(d) a communication link between said hand-held optical reader and said decoder for communicating optical image information received by said area array of photosensor elements; and
(e) a light source for illuminating the exterior region exterior of the hand-held optical reader unit and including the predetermined area of information, such that a complete image of the information within the predetermined area is focused onto said area array of photosensor elements wherein said light source is a flashable light source said flashable light source means including an illuminator disposed in a ring configuration about said longitudinal optical axis said flashable illuminator being in the form of a ring-type xenon flash tube.

* * * * *